HEAT DISSIPATING MOUNT FOR ELECTRIC COMPONENTS

Filed July 26, 1961

INVENTOR.
ROBERT T. SCHULTZ
BY
Nilsson & Robbins
ATTORNEYS.

United States Patent Office 3,163,207
Patented Dec. 29, 1964

3,163,207

HEAT DISSIPATING MOUNT FOR ELECTRIC COMPONENTS

Robert T. Schultz, 1250 N. Tressy Ave., Glendora, Calif.

Filed July 26, 1961, Ser. No. 127,005
1 Claim. (Cl. 165—68)

This invention relates generally to heat dissipation from electronic circuitry, and more particularly to heat sink and heat dissipating structures for mounting and supporting high power transistors and other miniaturized power components.

With the development of solid state devices, such as diodes and transistors, of higher and higher power handling capabilities, it has become more and more an acute problem to dissipate the heat generated within these devices so that the full benefit of their power handling capabilities may be obtained and utilized without at the same time sacrificing and of the advantages of these devices in reliability, low weight, and compactness.

Prior art attempts to dissipate the heat generated by miniaturized power components, such as power transistors, have typically been directed towards solutions which compromise one or more of the advantages otherwise available or incumbent with such circuitry. For example, cooling fins have been added to chassis panels in the vicinity of the transistors, but these have normally been either so large and bulky and heavy as to detract seriously from the compactness otherwise available with transistorized circuitry; or else they have not provided adequate dissipation of the heat, causing the transistors thereby to be either operated at lower power or at higher temperatures. To compromise in the direction of higher operating temperatures is to detract from the prolonged-life characteristics and reliability otherwise anticipated with transistor and solid state diode components, for example.

Other attempts at a satisfactory solution have been directed toward such complex structures or arrangements for mounting the transistors as to be extremely costly and not readily adaptable to a large number of applications which results in such solutions being economically not practical.

It is therfore an object of the present invention to provide a structure for mounting power transistors and diodes and other miniaturized power components which is not subject to these and other disadvantages of the prior art.

It is another object to provide such a structure which is light and compact but capable of great heat conduction and dissipation.

It is another object to provide such a structure which is low in cost and highly versatile in its adaptability to a large number of different applications.

Briefly, these and other objects are achieved in one embodiment of the invention in a transistor mounting structure which is manufactured in the form of extruded aluminum which is low in cost because the aluminum material is inexpensive and is relatively easily ductible. Aluminum provides also the significant advantages of high thermal conduction, high electrical conduction when the mounting structure is integral with the ground bus, high structural strength with low weight, attractive appearance, and a non-corrosive surface so that heat may be conducted and radiated through the surface boundary of the structure without having to propagate through an insulative coating of paint or a reflective plating.

A cross-section of the figure of extrusion may be described as an H-member with an elongated cross-bar on and through the central portion of which may be mounted the power transistors or other miniaturized power components. The cross-bar in the cross-section is parallel to and spaced from a baseline intersecting the lower ends of each of the side portions of the H-member. Disposed on these lower ends and along the baseline are extension members or footings which may be utilized for securing the extruded form to the base chassis or panel.

Disposed along and intersecting with the cross-bar in spaced planes between the side members and the central mounting portion are six dissipating fins. The fins are parallel to the side portions of the H-member and extend upwardly from the cross-bar to a height equal to that of the side members. The fins extend downwardly toward but do not intersect the baseline.

In the figure of extrusion, all the surfaces parallel to the planes of the side members are serrated with ridges parallel to the line of extrusion. In a preferred embodiment to be discussed in more detail below, these serrated surfaces have more than forty percent more area than that of their plan projections. These surfaces can therefore dissipate approximately forty percent more heat than if they were not serrated. It is to be noted that this advantage is in fact achieved by removing a significant portion of the metal of the structure as it would be without the serrations; thus the heat dissipation capacity of the strucure is greatly increased and the weight of the structure is correspondingly decreased with no increase in bulkiness or over-all dimensions.

In the extruded form, the central portion of the "cross-bar" may be perforated for mounting the power components, and the footings may be perforated along their length parallel to the line of extrusion for fastening the structure, as with machine or sheet metal screws, to the baseline. The entire mounting structure may then be immersed in a coolant fluid, such as oil or moving air, whereby the serrated surfaces make continuous conductive contact with the coolant which may be circulated by convection or forced draft.

These and other novel features of the invention and other embodiments thereof will become apparent and be more fully understood from a consideration of the following description of the invention taken in connection with the accompanying drawings, in which.

Referring to the particular figures, it is stressed that the details shown are by way of example only and are presented in the cause of providing what is believed to be the most useful and readily understood description of the principles of the invention. The particular detailed showing is not to be taken as a limitation on the scope of the invention, which is to be measured by the appended claim forming a part of this specification.

Figure 1:
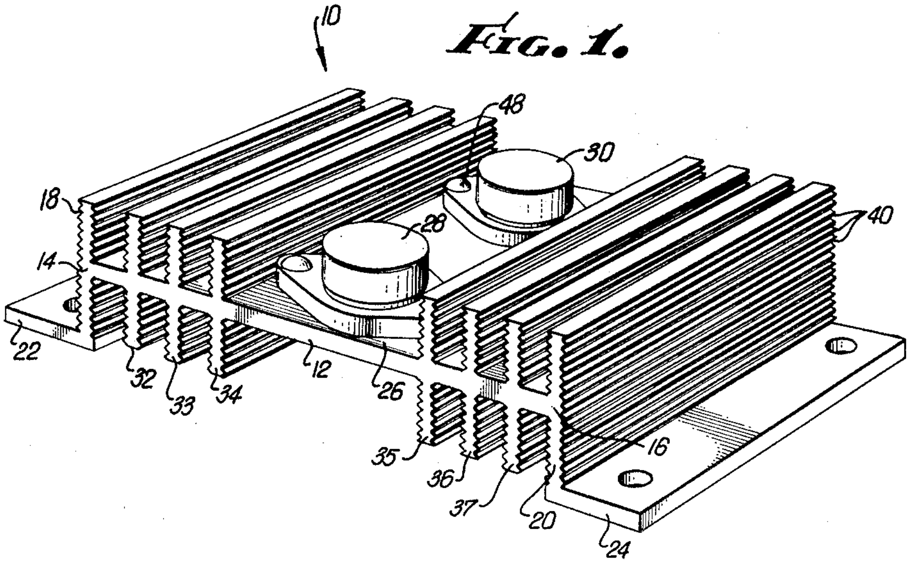
FIG. 1 is a pictorial view of a heat dissipating mount for power transistors constructed in accordance with the principles of the present invention.

In FIG. 1 there is shown a heat dissipating mounting structure 10 in the form of a figure of extrusion. The structure 10 includes a mounting panel 12 which has oppositely disposed longitudinal edges 14 and 16. Disposed along the edges 14 and 16 are a pair of parallel supporting panels 18 and 20. The panels 18 and 20 are substantially perpendicularly disposed with respect to the mounting panel 12. The bottom edge, as viewed in the figure, of each of the panels 18, 20 is terminated with a footing member 22, 24, respectively. The footing members 22, 24 lie parallel to and contiguously to a predetermined plane which may be designated the base plane or chassis plane, not shown in the figure. The mounting panel 12 is spaced from the base plane and is parallel to the footing members 22, 24. Along the central portion of the mounting panel 12 is a mounting portion 26 upon which may be mounted miniaturized power components, such as a pair of high power transistors 28, 30. The mounting portion 26 may be appropriately perforated for mounting screws and conducting leads associated with the transistors.

Disposed along the mounting panel 12 between the mounting portion 26 and the supporting panels 18, 20 are shown three parallel heat dissipating panels 32, 33, 34 on the left side of the mounting portion 26, as seen in the figure, and 35, 36, 37 on the right side of the mounting portion 26. In this example, each of the heat dissipating panels extends upwardly to a distance approximately equal to the upward extension of the supporting panels 18, 20. Similarly, each of the fins extends downwardly toward the chassis plane but do not actually intersect the plane coincident with the bottom surfaces of the footing members 22, 24. All of the vertical surfaces of the heat dissipating panels and the supporting panels are serrated by ridges 40 which are formed longitudinally along the structure 10 parallel to the line of extrusion of the figure. The geometrical form and orientation of these serrations will be discussed in further detail in connection with the subsequent figures.

Figures 2, 3:
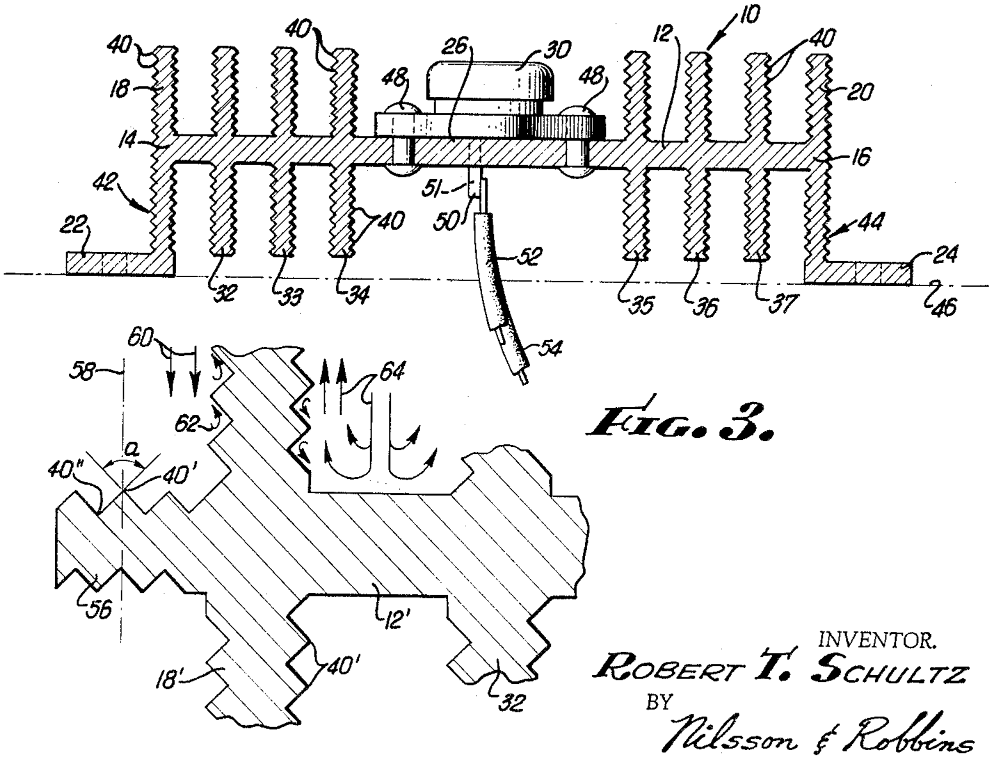
FIG. 2 is a cross-sectional view of the structure depicted in FIG. 1.
FIG. 3 is a more detailed portion of a sectional view of an alternative embodiment of the invention.

Referring to FIG. 2, the cross-section of the figure of extrusion of FIG. 1 is shown in more detail. The cross-section may be viewed as comprising a pair of L-shaped members 42, 44 which are disposed symmetrically back-to-back with their bases parallel and lying along a base plane 46. The bases of the L's are formed by the footing members 22 and 24 while the backs of the L's are formed by the supporting panels 18 and 20, respectively. The backs of the L's are joined near their mid-portions by the mounting panel 12 which is spaced from and disposed parallel to the base plane 46. The central portion of the mounting panel 12 again represents the mounting portion 26 upon which is mounted a transistor 30. To either side of the mounting portion 26 are illustrated the three heat dissipating panels 32, 33, 34 to the left and 35, 36, 37 to the right. The figure illustrates that in the example each of the heat dissipating panels as well as the supporting panels 18, 20 extend upwardly by an equal amount so that their upper edges lie substantially in a single upper plane disposed parallel to the base plane 46. The high power transistor 30 is shown mounted to the mounting portion 26 with rivets or screws 48 and its leads 50, 51 project through the perforated mounting portion 26 to make contact with external leads 52, 54. In the figure it may be seen that the heat dissipating panels 32–37 extend downwardly toward but do not intersect the base plane 46. This feature of the invention permits the circulation of cooling fluid into and out of the spaces between the heat dissipating panels between the mounting panel 12 and the base plane 46. The figure illustrates again that the vertical surfaces as viewed in the drawing, are all serrated with the ridges 40 formed therein by preferably an extrusion process.

The cross-section of FIG. 2 may also be described as an H-member in which the side members are formed by the supporting panels 18 and 20 and the cross-bar represents the mounting panel 12.

Referring to FIG. 3 there is shown a portion of a cross-section of an alternative embodiment of the invention. In this example the cross-bar of the H-member representing a mounting panel 12' extends beyond the side members or supporting panel 18' to form an additional cooling fin 56. The remaining features of the embodiment of FIG. 3 are substantially similar in all important respects to those of the embodiment of previous figures, including the dissipating panels, the base plane 46, and the footing member 22. However, the enlarged nature of FIG. 3 permits a more detailed illustration of the serrations or ridges 40'. The serrations comprise, in a presently preferred embodiment, a right angle ridge 40' and a right angle trough 40''. In order to maximize the surface area thus provided, these ridges and troughs are each substantially symmetrically disposed about a plane 58 which is perpendicular to the plane of the mounting panel 12' and parallel to the line of extrusion and which passes through the apex of either a ridge 40' or a trough 40''. The surfaces thusly ridged therefore provide an area which is increased by a factor of the square root of two with respect to the area of the plane projection of that surface.

The transistor mounting structures described above in connection with FIGS. 1, 2 or 3 are normally cooled predominantly by the passage of a coolant fluid, such as air, longitudinally along the length of the structure along its line of extrusion. The coolant is thereby exposed to approximately forty percent more area than if the heat dissipating panels were not serrated and to an even far greater percentage of area than if the power transistors were mounted on a structure without heat dissipating panels or directly onto the base chassis panel. However, other drafts of coolant air will also normally exist which will have components of direction of flow which are perpendicular to the line of extrusion such as the air currents 60 indicated by the downwardly directed arrows near the upper portion of FIG. 3. Air currents with such transverse components of direction may be caused by forced drafts or by random environmental drafts or by convection drafts caused by the heating of the structure or by associated equipment. The ridges 40' and troughs 40'' give rise to a turbulent flow of air about the structure as indicated by the curved vectors 62. This turbulent flow of the coolant causes a continuous mixing of the different portions of the body of coolant so as to prevent a more or less insulating sheath of heated coolant to lie near the surface of the mounting structure. Similarly, air currents 64 passing across the inwardly disposed surface of the supporting panel 18' provide more effective cooling by virtue of a turbulent mixing due to the ridges 40'. The coolant currents 60 and 64 may be particularly predominant when convection cooling and radiation are relied upon as opposed to forced drafts for dissipating heat from the structure.

It has been found to be advantageous in many applications to provide the heat dissipating surfaces of the structure 10 with a dull and preferably black surface coating. For example, the entire structure may be anodized to minimize internal reflections of the heat and thereby provide a better and more efficient radiating surface. A coating of black paint may alternatively be applied to the surfaces of the structure 10. However, such a coating is preferably of a non-insulating paint and is made as thin as possible to minimize the conduction resistance for the heat passing through the boundary from the metal structure to the coolant.

There has thus been disclosed a heat dissipating mounting structure for miniaturized power components which has extremely high heat conduction and dissipation capacities and a greatly increased dissipating area with an even lighter weight than if its surfaces were not ridged and serrated. In addition to these and many other advantages, the structure may be readily manufactured as a figure of extrusion such that it may be supplied and sold by-the-foot or pre-cut into any desired marketable lengths. The structure is therefore extremely versatile and inexpensive to produce and to stock.

What is claimed is:

A lightweight heat dissipating mount for power transistors associated with a supporting chassis comprising as a figure of extrusion of aluminum a mounting panel lying substantially in a predetermined plane, said panel having a pair of oppositely disposed parallel longitudinal edges, a pair of supporting panels disposed in parallel planes substantially perpendicularly to said predetermined plane and affixed rigidly thermally conductively to said mounting panel on different ones of said pair of edges, said supporting panels extending to a chassis plane parallel to and spaced from said predetermined plane, mounting means disposed on said supporting panels along said chassis plane for supportably connecting said supporting panels to the supporting chassis, a transistor mounting portion on said mounting panel disposed centrally between said longitudinal edges, a plurality of heat dissipating panels mounted on said mounting panel on each side of said central mounting portion disposed substantially parallel to said supporting panels, and serrations formed in said mount disposed over substantially the entire area of said mounting and heat dissipating panels, said serrations being disposed parallel to the line of said extrusion and comprising ridges and troughs each formed with apexes of approximately ninety degrees and such that the surface of each of said heat panels is approximately forty percent greater than the area of its respective plan projection, said heat dissipating panels extending above said mounting panel and extending below said mounting panel at least nearly to said chassis plane.

References Cited by the Examiner

UNITED STATES PATENTS

| | | | |
|---|---|---|---|
| 2,306,704 | 12/42 | Kogel | 165—179 |
| 2,984,774 | 5/61 | Race | 317—234 |

CHARLES SUKALO, *Primary Examiner.*

JAMES D. KALLAM, *Examiner.*